(12) United States Patent
Jeong et al.

(10) Patent No.: US 7,965,571 B2
(45) Date of Patent: Jun. 21, 2011

(54) ON DIE THERMAL SENSOR

(75) Inventors: Chun-Seok Jeong, Kyoungki-do (KR); Kee-Teok Park, Kyoungki-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 1024 days.

(21) Appl. No.: 11/647,351

(22) Filed: Dec. 29, 2006

(65) Prior Publication Data

US 2008/0082291 A1 Apr. 3, 2008

(30) Foreign Application Priority Data

Sep. 28, 2006 (KR) .................. 10-2006-0095162

(51) Int. Cl.
*G11C 7/00* (2006.01)
*G01K 1/08* (2006.01)

(52) U.S. Cl. ......... 365/222; 365/211; 374/141; 374/142

(58) Field of Classification Search .................. 365/211, 365/222; 374/141, 142
See application file for complete search history.

(56) References Cited

U.S. PATENT DOCUMENTS

| | | | |
|---|---|---|---|
| 6,556,496 B2 | 4/2003 | Benedix et al. | |
| 6,768,693 B2 | 7/2004 | Feurle et al. | |
| 7,038,968 B2 | 5/2006 | Kim | |
| 2003/0056057 A1 | 3/2003 | Lawrence | |
| 2005/0007864 A1* | 1/2005 | Chung et al. | 365/232 |
| 2005/0052919 A1* | 3/2005 | Chou | 365/222 |
| 2005/0185491 A1* | 8/2005 | Kim et al. | 365/222 |
| 2006/0056257 A1 | 3/2006 | Origasa | |
| 2006/0203589 A1* | 9/2006 | Lee | 365/222 |
| 2007/0070760 A1* | 3/2007 | Kim | 365/212 |
| 2007/0109013 A1* | 5/2007 | Lee et al. | 326/32 |
| 2007/0121407 A1* | 5/2007 | Lee | 365/222 |
| 2007/0126471 A1* | 6/2007 | Jeong | 326/30 |
| 2007/0274145 A1* | 11/2007 | Sohn | 365/222 |
| 2007/0280330 A1* | 12/2007 | Jeong et al. | 374/141 |

FOREIGN PATENT DOCUMENTS

| KR | 1998-015460 | 5/1998 |
|---|---|---|
| KR | 2000-0068150 | 11/2000 |
| KR | 10-2001-0004581 A | 1/2001 |

(Continued)

OTHER PUBLICATIONS

Korean Office Action issued in corresponding Korean Patent Application No. KR 10-2006-0095162, dated Oct. 25, 2007.

(Continued)

*Primary Examiner* — Ly D Pham
(74) *Attorney, Agent, or Firm* — IP & T Group LLP

(57) ABSTRACT

An on die thermal sensor (ODTS) for use in a semiconductor memory device includes: a temperature information code generation unit for sensing an internal temperature of the semiconductor memory device in response to first and second enable signals and for generating a temperature information code which includes the sensed temperature information; and a flag signal logic determination unit for generating a plurality of first flag signals having temperature information and determining whether the plurality of first flag signals have a predetermined logic level or a variable logic level in response to the first and second enable signals.

25 Claims, 6 Drawing Sheets

FOREIGN PATENT DOCUMENTS

| | | |
|---|---|---|
| KR | 10-2002-0091657 A | 12/2002 |
| KR | 10-2004-0103017 A | 12/2004 |
| KR | 10-2005-0033123 A | 4/2005 |
| KR | 10-2005-0063880 | 6/2005 |
| KR | 10-2005-0067520 A | 7/2005 |
| KR | 10-2005-0082579 A | 8/2005 |
| TW | I254312 | 5/2006 |

OTHER PUBLICATIONS

Korean Notice of Allowance issued in Korean Patent Application No. KR 10-2006-0095162, dated Apr. 29, 2008.

Notice of Preliminary Rejection issued from Taiwan Intellectual Property Office on Mar. 1, 2011.

* cited by examiner

FIG. 2

| | TEMPERATURE | LOW | | | HIGH |
|---|---|---|---|---|---|
| TRIP POINT FLAG | TEMPA | L | H | H | H |
| | TEMPB | L | L | H | H |
| | TEMPC | L | L | L | H |
| | SELF REFRESH OSCILLATION SIGNAL PERIOD | 15% INCREASE | 5% INCREASE | UNCHANGED | 50% DECREASE |

ON DIE THERMAL SENSOR

CROSS-REFERENCE TO RELATED APPLICATIONS

The present invention claims priority of Korean patent application number 10-2006-0095162, filed on Sep. 28, 2006, which is incorporated by reference in its entirety.

BACKGROUND OF THE INVENTION

The present invention relates to updating temperature information of an on die thermal sensor (ODTS), and more particularly, to a circuit for correctly updating temperature information regardless of an operation mode of a dynamic random access memory (DRAM).

A dynamic random access memory (DRAM) cell includes a transistor for operating as a switch and a capacitor for storing a charge, i.e., data. According to whether the capacitor stores the charge, i.e., whether a terminal voltage of the capacitor is high or low, a logic level of the data is determined as a high level or a low level.

Since the data is stored in the capacitor as an accumulated electrical charge form, there is no power consumption for the data storage ideally. However, since there occurs a leak current due to a PN junction of a metal oxide semiconductor (MOS) transistor, the stored initial charge may be discharged and, thus, the data may vanish.

To prevent data loss, the data stored in a memory cell is read and the read data is restored into the memory cell by recharging the memory cell with a normal charge before the data vanishes. This operation should be periodically performed in order to maintain data.

The above-mentioned recharging operation is called a refresh operation and, generally, a control of the refresh operation is performed by a DRAM controller. Due to the refresh operation, refresh power is consumed. In case of a battery operated system, which requires lower power consumption, reducing power consumption is very important and is a critical issue.

One method of reducing the power consumption for the refresh operation is changing a refresh period according to temperature. As the temperature decreases, a data holding time of the DRAM is longer. Therefore, by dividing a temperature range into several temperature regions and by lowering a frequency of a refresh clock at a relative low temperature region, power consumption is reduced.

Accordingly, a device for correctly sensing the temperature of the inside of the DRAM and for adjusting the refresh clock frequency is required.

As a semiconductor unit is highly integrated and is operated at a higher speed, a significant amount heat is generated. The generated heat increases internal temperature of the semiconductor unit and, thus, can prevent the semiconductor unit from normal operation. The generated heat may cause a defect in the semiconductor unit.

Therefore, a device for correctly sensing the temperature of the semiconductor unit and for outputting the sensed temperature information is needed.

SUMMARY OF THE INVENTION

Embodiments of the present invention are directed to an on die thermal sensor (ODTS) for correctly updating temperature information regardless of an operation mode of a dynamic random access memory (DRAM).

In accordance with an aspect of the present invention, there is provided an on die thermal sensor (ODTS) for use in a semiconductor memory device, including: a temperature information code generation unit for sensing an internal temperature of the semiconductor memory device in response to first and second enable signals and for generating a temperature information code including the sensed temperature information; and a flag signal logic determination unit for generating a plurality of first flag signals having temperature information and for determining whether the plurality of first flag signals have a predetermined logic level or a variable logic level in response to the first and second enable signals.

In accordance with another aspect of the present invention, there is provided a semiconductor memory device, including: a temperature information code generation unit for sensing an internal temperature of the semiconductor memory device at an on state in response to first and second enable signals and for generating a temperature information code which includes the sensed temperature information; a flag signal logic determination unit for generating a plurality of first flag signals which have temperature information and for determining whether the plurality of first flag signals have a predetermined logic level or a variable logic level in response to the first and second enable signals; and a self refresh period change unit for changing a period of a self refresh operation at a self refresh mode in response to the plurality of first flag signals.

BRIEF DESCRIPTION OF THE DRAWINGS

FIG. 2 is a timing diagram showing a relation between a plurality of flag signals generated by a flag signal generation unit shown in FIG. 1 and a period of a self refresh operation;

DESCRIPTION OF SPECIFIC EMBODIMENTS

It is an object of the present invention to provide an on die thermal sensor (ODTS) for preventing incorrect temperature information from being generated by operating a temperature information code generation unit regardless of an operation mode of a semiconductor device.

Hereinafter, the ODTS in accordance with the present invention will be described in detail referring to the accompanying drawings.

Figure 1:
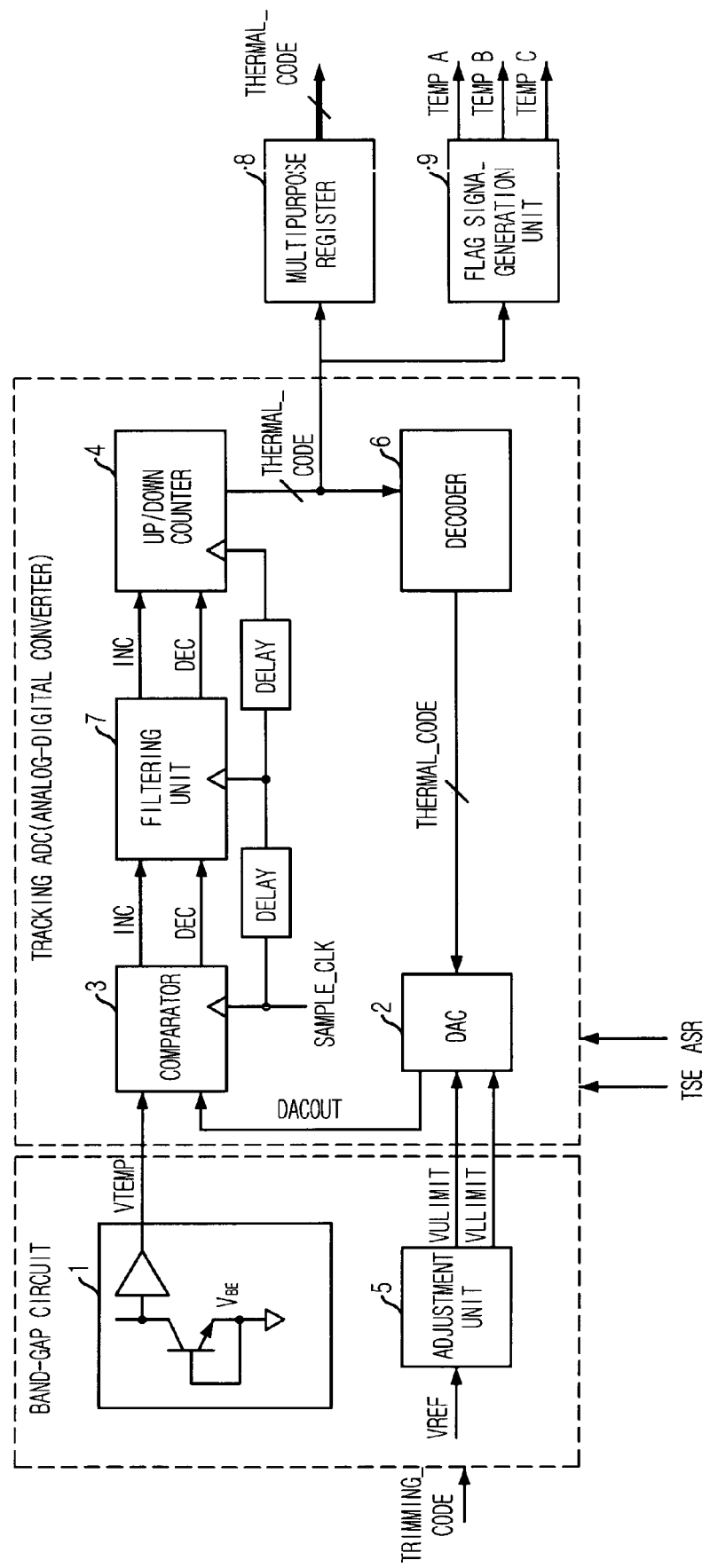
FIG. 1 is a block diagram of an on die thermal sensor (ODTS) for use in a semiconductor device in accordance with a first embodiment of the present invention.

FIG. 1 is a block diagram of an on die thermal sensor (ODTS) for use in a semiconductor device in accordance with a first embodiment of the present invention.

The ODTS in accordance with the first embodiment of the present invention includes a temperature sensing unit 1, a digital-analog converter (DAC) 2, a comparator 3, an up/down counter 4, an adjustment unit 5, a decoder 6, a filtering unit 7, a multipurpose register 8 and a flag signal generation unit 9.

The temperature sensing unit 1 senses an internal temperature of the semiconductor device by using characteristics of a bipolar junction transistor (BJT) included in a band-gap circuit. That is, a base-emitter voltage $V_{BE}$ of the BJT changes according to a temperature in the ratio of about −1.8 mV/° C.

That is, the temperature sensing unit 1 generates a temperature voltage VTEMP which 1:1 corresponds to a temperature variation by amplifying the base-emitter voltage $V_{BE}$ of the BJT which minutely changes according to the temperature variation.

The DAC 2 converts a digital temperature information code THERMAL_CODE to an analog tracking voltage DACOUT. Herein, the tracking voltage DACOUT is lower than a first variation voltage VULIMIT and is higher than a second variation voltage VLLIMIT, wherein the first and the second variation voltages VULIMIT and VLLIMIT are output from the adjustment unit 5.

The comparator 3 compares the temperature voltage VTEMP with the tracking voltage DACOUT in order to activate an increase signal INC when a voltage level of the temperature voltage VTEMP is lower than that of the tracking voltage DACOUT. On the other hand, when the voltage level of the temperature VTEMP is high than that of the tracking voltage DACOUT, the comparator 3 adjusts a voltage level of a decrease signal DEC and outputs the adjusted signal.

The up-down counter 4 outputs the temperature information code THERMAL_CODE after increasing the temperature information code THERMAL_CODE by 1-bit when the increase signal INC is activated. In the same manner, the up-down counter 4 outputs the temperature information code THERMAL_CODE after decreasing the temperature information code THERMAL_CODE by 1-bit when the decrease signal DEC is activated.

The adjustment unit 5 generates the first and the second variation voltages VULIMIT and VLLIMIT in response to a reference voltage VREF generated in the band-gap circuit.

Since the reference voltage VREF is generated in the band-gap circuit, the reference voltage VREF maintains a constant voltage level in spite of a variation of process, voltage and temperature (PVT). However, during a manufacturing process of the semiconductor device, a voltage level of the reference voltage VREF may be differently determined according to characteristics of each die. Therefore, before the first and the second variation voltages VULIMIT and VLLIMIT are generated, the voltage level of the reference voltage VREF is adjusted according to a partial code of an externally input trimming code TRIMMING_CODE, e.g., upper 3 bits of the trimming code when the trimming code is an 8-bit code.

Like the reference voltage VREF, the first and the second variation voltages VULIMIT and VLLIMIT keep a constant voltage level in spite of the PVT variation.

A voltage level difference between the first and the second variation voltages VULIMIT and VLLIMIT is determined according to a partial code of the trimming code TRIMMING_CODE, i.e., the other bits of the trimming code TRIMMING_CODE except the bits used for adjusting a voltage level of the reference voltage VREF, e.g., lower 5 bits of the trimming code when the trimming code is an 8-bit code.

The decoder 5 decodes the temperature information code THERMAL_CODE and outputs the decoded signal in order to correct an error generated due to a transfer time-lag when the decoder 6 transfers the temperature information code THERMAL_CODE to the DAC 2 through a feedback.

According to the error generated due to the transfer time-lag, the DAC 2 sensitively reacts and determines a voltage level of the tracking voltage DACOUT before the temperature information code THERMAL_CODE is completely input and, thus, wrong information is input to the comparator 3.

The filtering unit 7 prevents wrong information from being transferred to the up/down counter 4 when the comparator 3 compares the temperature voltage VTEMP with the tracking voltage DACOUT. That is, if the increase and the decrease signals INC and DEC are alternately activated, the filtering unit 7 recognizes that a wrong result is output from the comparator 3 and, thus, filters the increase and the decrease signals INC and DEC not to transfer the increase and the decrease signals INC and DEC to the up/down counter 4. However, if the increase or the decrease signals INC or DEC are sequentially activated in a predetermined number of times, e.g., about 3 times, the filtering unit 7 recognizes that a correct result is output from the comparator 3 and transfers the increase and the decrease signals INC and DEC to the up/down counter 4.

The comparator 3, the up/down counter 4 and the filtering unit 7 are operated in response to a sample clock SAMPLE_CLK generated by a memory controller. The comparator 3, the up/down counter 4 and the filtering unit 7 are not operated at the same time but are operated by turns having a predetermined interval of time delay.

The multipurpose register 8 stores the temperature information code THERMAL_CODE which has the most recent temperature information of the semiconductor device.

That is, when the up/down counter 4 updates the temperature information code THERMAL_CODE in response to the increase or the decrease signals INC or DEC, the multipurpose register 7 stores the updated temperature information code. At this time, the previously stored code is deleted.

The flag signal generation unit 9 generates a plurality of flag signals, i.e., TEMP A, TEMP B and TEMP C, according to the temperature information code THERMAL_CODE.

That is, the flag signals have different logic levels according to an internal temperature of the semiconductor device. The generated plurality of flag signals are used for controlling a period of a self refresh operation.

FIG. 2 is a timing diagram showing a relation between the plurality of flag signals generated by the flag signal generation unit 9 and the period of the self refresh operation.

As shown, logic levels of the plurality of flag signals TEMP A, TEMP B and TEMP C are changed according to a temperature variation. As the temperature increases, relatively more flag signals are changed to a logic high level.

According to the logic level variation of the plurality of flag signals, the period of the self refresh operation is changed.

When the temperature decreases so that the all of the plurality of flag signals are in a logic low level, a retention time of a memory cell is prolonged and, thus, the period of the self refresh operation is increased by 15%. The retention time is a required keeping time of a charge quantity needed for generating a voltage which is used for data stored in a memory cell to be normally amplified by a bit line sense amplifier (BLSA).

When one of the plurality of flag signals, i.e., TEMP A, is in a logic high level, the period of the self refresh operation is increased by 5%.

When two of the plurality of flag signal, i.e., TEMP A and TEMP B, are in a logic high level, the period of the self refresh operation is not changed (1x).

When all of the plurality of flag signals are in a logic high level, the period of the self refresh operation is decreased by 50%.

The ODTS is operated in response to two enable signals which control an operation mode. Detailed operation of the ODTS according to the operation mode is described below.

TABLE 1

| Enable Signal | | On-Die Thermal Sensor Operation | |
|---|---|---|---|
| TSE (Thermal Sensor Enable) | ASR (Auto Self Refresh) | Normal Operation | Self Refresh Operation |
| L | L | Disable | Disable |
| L | H | Disable | Enable |
| H | L | Enable | Disable |
| H | H | Enable | Enable |

Referring to Table. 1, a normal operation of the ODTS is controlled in response to a thermal sensor enable signal TSE.

Likewise, a self refresh operation of the ODTS is controlled in response to an auto self refresh signal ASR.

When the thermal sensor enable signal TSE is in a logic low level and the auto self refresh signal ASR is in a logic low level, the ODTS is disabled regardless of the operation mode.

When the thermal sensor enable signal TSE is in a logic low level and the auto self refresh signal ASR is in a logic high level, the ODTS is enabled at a self refresh mode of the semiconductor device and is disabled at a normal mode of the semiconductor device.

When the thermal sensor enable signal TSE is in a logic high level and the auto self refresh signal ASR is in a logic low level, the ODTS is enabled at the normal mode and is disabled at the self refresh mode.

When the thermal sensor enable signal TSE is in a logic high level and the auto self refresh signal ASR is in a logic high level, the ODTS is enabled regardless of the operation mode.

Figure 3:
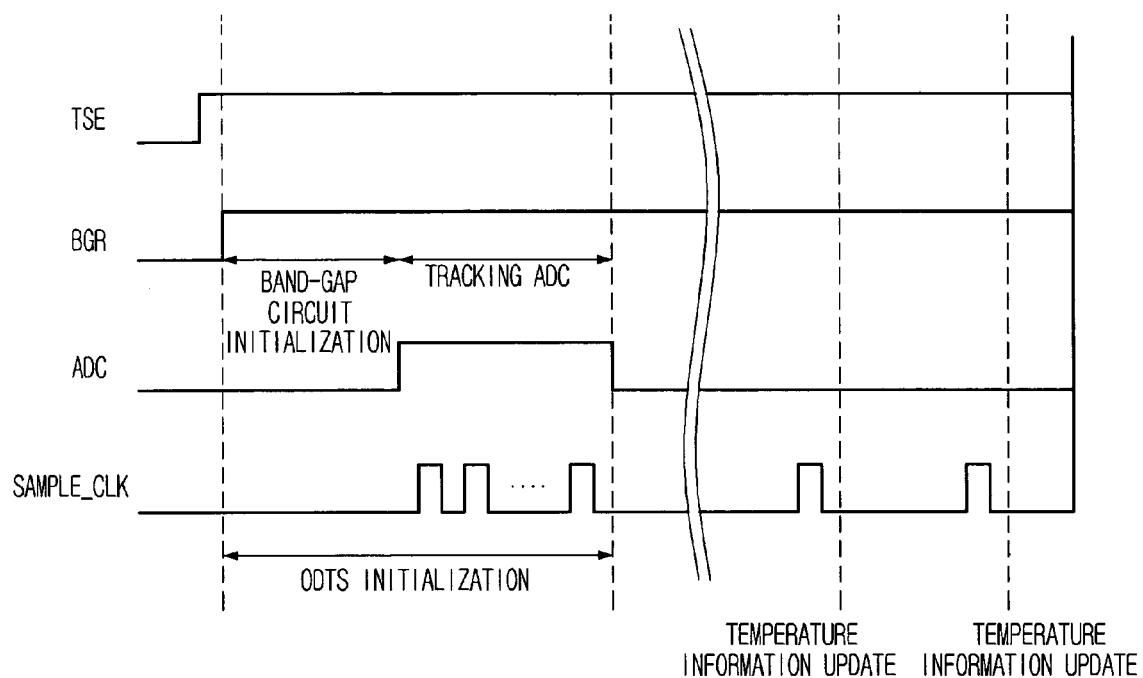
FIG. 3 is a waveform diagram depicting an operation of the ODTS shown in FIG. 1 at a normal operation.

FIG. 3 is a waveform diagram depicting an operation of the ODTS shown in FIG. 1 at the normal operation.

Referring to FIGS. 1 and 3, an operational sequence of the ODTS is described below.

First, when the thermal sensor enable signal TSE is activated, an initialization operation of the ODTS begins.

Second, in response to the activation of the thermal sensor enable signal TSE, a first operation control signal BGR is activated and is output from the memory controller.

Third, in response to the activation of the first operation control signal BGR, the temperature sensing unit 1 senses a temperature of the semiconductor device and initializes a voltage level of the temperature voltage VTEMP which is generated according to the sensed temperature.

Further, in response to the activation of the first operation control signal BGR, the adjustment unit 5 initializes voltages levels of the first and the second variation voltages VULIMIT and VLLIMIT.

The endurance time of the activation of the first operation control signal BGR, i.e., the initialization time of the temperature sensing unit 1 and the adjustment unit 5, is defined in the memory controller.

Fourth, when the initialization operations of the temperature sensing unit 1 and the adjustment unit 5 are finished, the memory controller activates and outputs a second operation control signal ADC.

Fifth, in response to the activation of the second operation control signal ADC, the DAC 2, the comparator 3, the up/down counter 4, the decoder 6 and the filtering unit 7 are operated so that the operation of converting a voltage level of the temperature voltage VTEMP, which is an analog value, to the temperature information code THERMAL_CODE, which is a digital value, begins.

According to characteristics of the up/down counter 4, the temperature information code THERMAL_CODE is increased or decreased by one bit at a single converting operation. Therefore, the voltage level of the temperature voltage VTEMP is converted to the temperature information code THERMAL_CODE by repeatedly performing the converting operation.

That is, the sample clock SAMPLE_CLK should repeatedly toggle during the activation period of the second operation control signal ADC.

At each converting operation, the temperature information code THERMAL_CODE output from the up/down counter 4 is stored into the multipurpose register 8. That is, at each converting operation, the temperature information of the semiconductor device is updated.

Although the flag signal generation unit 9 is operated in response to the temperature information code THERMAL_CODE output from the up/down counter 4, the plurality of flag signals TEMP A, TEMP B and TEMP C generated by the flag signal generation unit 9 are ignored because the semiconductor device is operated in the normal mode.

The endurance time of the activation of the second operation control signal ADC, i.e., the time of converting the voltage level of the temperature voltage VTEMP to the temperature information code THERMAL_CODE, is defined in the memory controller.

Sixth, when the second and the first operation control signals ADC and BGR are inactivated one after another, the initialization operation of the ODTS is completed.

Through the above-mentioned first to sixth steps, at the normal operation, the initialization operation of the ODTS is completed.

After the initialization operation of the ODTS, the temperature information of the semiconductor device is updated in response to the sample clock SAMPLE_CLK which is periodically output from the memory controller.

By applying the temperature information code THERMAL_CODE stored in the multipurpose register 8 to the up/down counter 4, the temperature information of the semiconductor device is updated by one bit.

Figure 4:
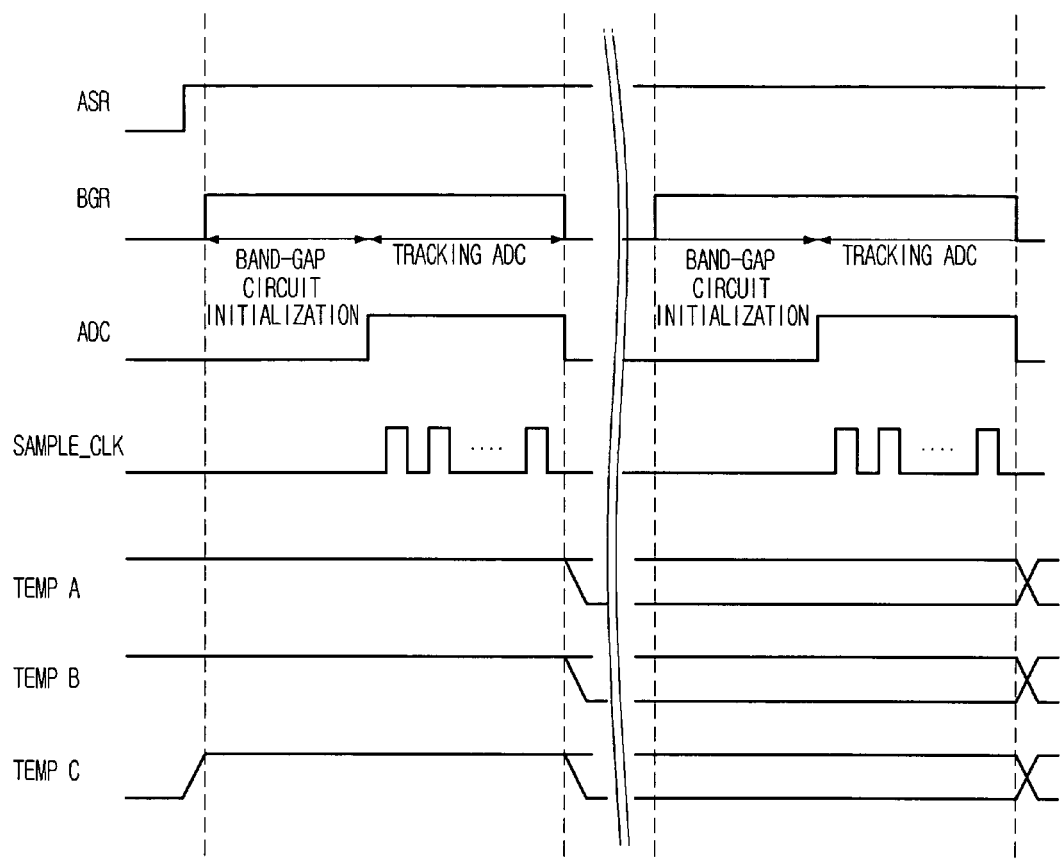
FIG. 4 is a waveform diagram illustrating an operation of the ODTS shown in FIG. 1 at a self refresh operation.

FIG. 4 is a waveform diagram illustrating an operation of the ODTS shown in FIG. 1 at the self refresh operation.

Referring to FIGS. 1 and 4, an operational sequence of the ODTS is described below.

First, when the auto self refresh signal ASR is activated, an initialization operation of the ODTS begins.

Second, in response to the activation of the auto self refresh signal ASR, the first operation control signal BGR is activated and output from the memory controller.

Third, in response to the activation of the first operation control signal BGR, the temperature sensing unit 1 senses a temperature of the semiconductor device and initializes a voltage level of the temperature voltage VTEMP which is generated according to the sensed temperature.

Further, in response to the activation of the first operation control signal BGR, the adjustment unit 5 initializes voltages levels of the first and the second variation voltages VULIMIT and VLLIMIT.

The endurance time of the activation of the first operation control signal BGR, i.e., the initialization time of the temperature sensing unit 1 and the adjustment unit 5, is defined in the memory controller.

Fourth, when the initialization operations of the temperature sensing unit 1 and the adjustment unit 5 are finished, the memory controller activates and outputs the second operation control signal ADC.

Fifth, in response to the activation of the second operation control signal ADC, the DAC 2, the comparator 3, the up/down counter 4, the decoder 6 and the filtering unit 7 are operated so that the operation of converting a voltage level of the temperature voltage VTEMP, which is an analog value, to the temperature information code THERMAL_CODE, which is a digital value, begins.

According to characteristics of the up/down counter 4, the temperature information code THERMAL_CODE is increased or decreased by one bit at a single converting operation. Therefore, the voltage level of the temperature voltage VTEMP is converted to the temperature information code THERMAL_CODE by repeatedly performing the converting operation.

That is, the sample clock SAMPLE_CLK should repeatedly toggle during the activation period of the second operation control signal ADC.

At each converting operation, the temperature information code THERMAL_CODE output from the up/down counter 4 is stored into the multipurpose register 8. That is, at each converting operation, the temperature information of the semiconductor device is updated.

Although the flag signal generation unit 9 is operated in response to the temperature information code THERMAL_CODE output from the up/down counter 4, the plurality of flag signals TEMP A, TEMP B and TEMP C keep constant logic levels, i.e., a logic high level, a logic high level and a logic low level respectively, because the ODTS is in process of performing the initialization operation.

The endurance time of the activation of the second operation control signal ADC, i.e., the time of converting the voltage level of the temperature voltage VTEMP to the temperature information code THERMAL_CODE, is defined in the memory controller.

Sixth, when the second operation control signal ADC, the first operation control signals BGR and the auto self refresh signal ASR are inactivated one after another, the initialization operation of the ODTS is completed.

Through the above-mentioned first to sixth steps, at the self refresh operation, the initialization operation of the ODTS is completed.

After the completion of the initialization operation, when the auto self refresh signal ASR is activated again, the temperature information of the semiconductor device is newly generated through the same manner of the above-mentioned first to sixth steps, i.e., the same manner of the initialization operation of the ODTS.

At the initialization operation of the ODTS, the plurality of flag signals TEMP A, TEMP B and TEMP C keep constant logic levels, i.e., a logic high level, a logic high level and a logic low level respectively, regardless of the temperature information code THERMAL_CODE.

However, after the initialization operation of the ODTS, the flag signal generation unit 9 is operated in response to the temperature information code THERMAL_CODE so that each logic level of the plurality of flag signals TEMP A, TEMP B and TEMP C is changed according to the internal temperature of the semiconductor device.

After the initialization operation of the ODTS, a method of updating the temperature information is different according to the normal operation and the self refresh operation.

That is, at the normal operation, the temperature information code THERMAL_CODE stored in the multipurpose register 8 is updated by one bit using the up/down counter 4 in response to the sample clock SAMPLE_CLK which is periodically output from the memory controller.

However, at the self refresh operation, the temperature information of the semiconductor device is newly generated through the same manner of the initialization operation.

As above-mentioned, since the updating method is different according to the normal operation and the self refresh operation, the following problems arise at a particular operation mode of the semiconductor device.

When the temperature sensor enable signal TSE is a logic high level and the auto self refresh signal ASR is a logic low level, the ODTS is operated at the normal mode and is not operated at the self refresh mode.

That is, if the semiconductor device enters the normal mode (normal mode entry), the ODTS stores the temperature information of the semiconductor device into the multipurpose register.

Further, if the semiconductor device exits from the normal mode (normal mode exit) and enters the self refresh mode (self refresh mode entry), the ODTS stops operating and stands by.

If the self refresh mode is kept for a long time (long self refresh entry/exit), there may be a difference between the temperature information of the semiconductor device stored in the multipurpose register at the self refresh mode entry and an actual temperature of the semiconductor device at the self refresh mode exit.

That is, when the semiconductor device enters the normal mode after keeping the self refresh mode for a long time, the ODTS updates the temperature information of the semiconductor device by using wrong temperature information which is stored in the multipurpose register before the self refresh mode entry.

Figure 5:
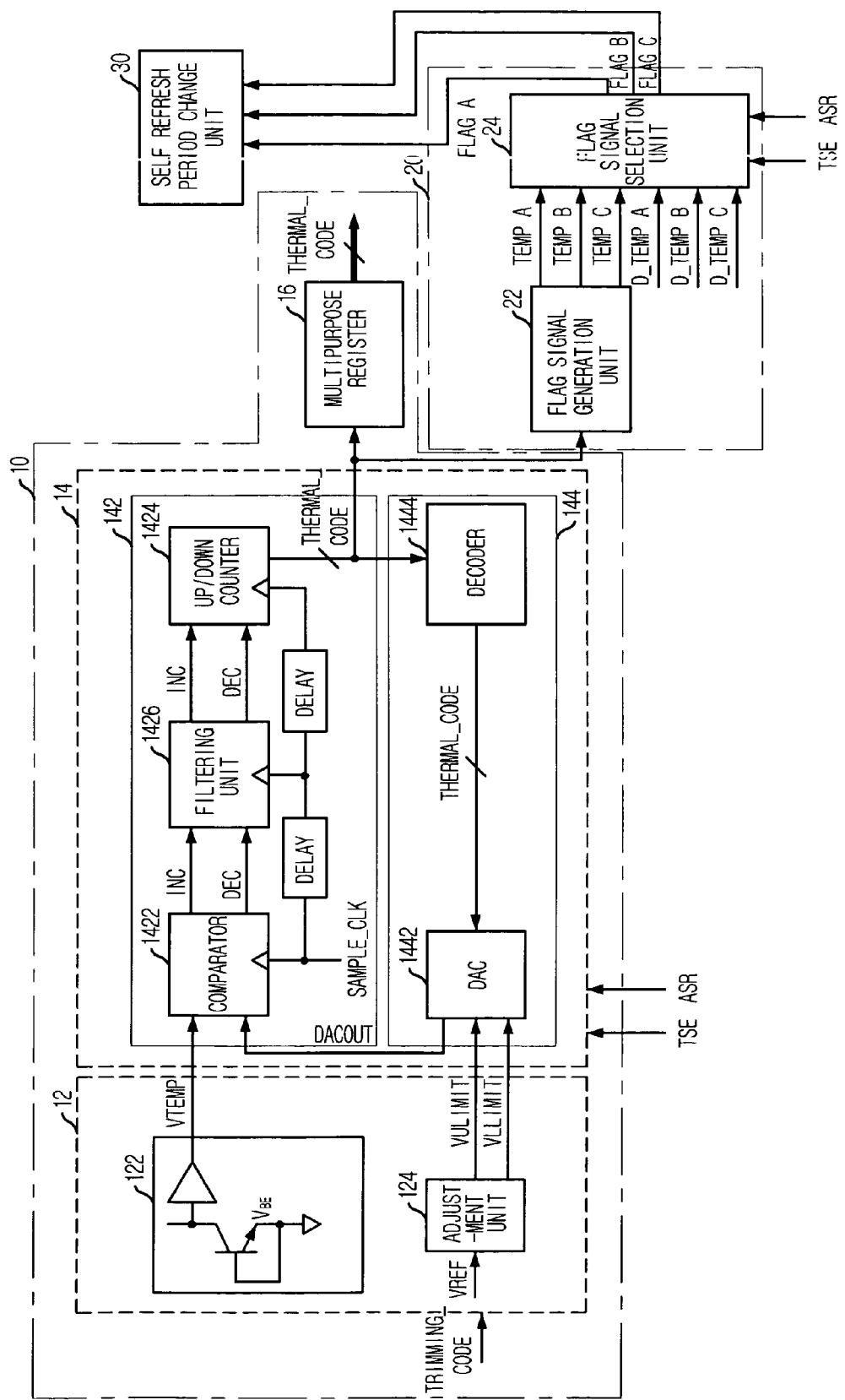
FIG. 5 is a block diagram of an ODTS for use in a semiconductor device in accordance with a second embodiment of the present invention.

FIG. 5 is a block diagram showing the ODTS for use in a semiconductor device in accordance with a second embodiment of the present invention.

The ODTS in accordance with the second embodiment of the present invention includes a temperature information code generation unit 10 and a flag signal logic determination unit 20.

The temperature information code generation unit 10 is controlled in response to enable signals TSE and ASR. At an on state, the temperature information code generation unit 10 measures an internal temperature of the semiconductor device and generates a temperature information code THERMAL_CODE which includes the measured temperature information.

The flag signal logic determination unit 20 generates a plurality of first flag signals FLAG A, FLAG B and FLAG C and determines whether the plurality of first flag signals FLAG A, FLAG B and FLAG C have a predetermined logic level or a variable logic level in response to the enable signals TSE and ASR.

Further, the semiconductor device includes a self refresh period change unit 30 for changing a period of a self refresh operation in response to the plurality of first flag signals FLAG A, FLAG B and FLAG C at the ODTS and the outside of the ODTS during a self refresh mode.

The temperature information code generation unit 10 includes a band-gap circuit 12, an analog-digital converting unit 14 and a multipurpose register 16.

The band-gap circuit 12 generates a temperature voltage VTEMP, a first variation reference voltage VULIMIT and a second variation reference voltage VLLIMIT. The temperature voltage VTEMP decreases as a temperature increases. Each of the first and the second variation reference voltages VULIMIT and VLLIMIT has a constant voltage level regardless of a temperature variation.

The analog-digital converting unit 14 converts the temperature voltage VTEMP which is an analog value to the temperature information code THERMAL_CODE which is a digital value according to each voltage level of the first and the second variation reference voltages VULIMIT and VLLIMIT.

The multipurpose register 16 receives and stores the temperature information code THERMAL_CODE.

The analog-digital converting unit 14 includes a comparison unit 142 for increasing or decreasing the temperature information code THERMAL_CODE according to a comparison result between each voltage level of the temperature voltage VTEMP and a tracking voltage DACOUT; and a voltage level determination unit 144 for determining a voltage level of the tracking voltage DACOUT in response to the temperature information code THERMAL_CODE. The determined voltage level of the tracking voltage DACOUT is equal to or smaller than the first variation reference voltage VULIMIT and is equal to or greater than the second variation reference voltage VLLIMIT.

The comparison unit 142 includes a comparator 1422, an up/down counter 1424 and a filtering unit 1426.

The comparator 1422 compares the temperature voltage VTEMP and the tracking voltage DACOUT in response to a clock signal SAMPLE_CLK received from a memory controller and determines each logic level of an increase signal INC and a decrease signal DEC based on the comparison result.

The up/down counter 1424 increases or decreases the temperature information code THERMAL_CODE in response to the increase signal INC and the decrease signal DEC and is operated in response to a delayed clock D_SAMPLE_CLK which is generated by delaying the clock signal SAMPLE_CLK.

The filtering unit 1426 filters the increase signal INC and the decrease signal DEC in order to protect the up/down counter 1424 from being incorrectly operated.

The voltage level determination unit 144 includes a digital-analog converter (DAC) 1442 and a decoder 1444.

The DAC 1442 converts the temperature information code THERMAL_CODE which is a digital value to the tracking voltage DACOUT which is an analog value. A voltage level of the tracking voltage DACOUT is changed in response to the first and the second variation reference voltage VULIMIT and VLLIMIT.

The decoder 1444 decodes the temperature information code THERMAL_CODE and transfers the decoded signal to the DAC 1442 in order to protect the DAC 1442 from being incorrectly operated.

The flag signal logic determination unit 20 includes a flag signal generation unit 22 and a flag signal selection unit 24.

The flag signal generation unit 22 generates a plurality of second flag signals TEMP A, TEMP B and TEMP C which have a variable logic level according to the temperature information code THERMAL_CODE.

The flag signal selection unit 24 selects one among the plurality of second flag signals TEMP A, TEMP B and TEMP C and a plurality of third flag signals D_TEMP A, D_TEMP B and D_TEMP C which have a predetermined logic level in order to output the selected signal as the plurality of first flag signals FLAG A, FLAG B and FLAG C in response to the enable signals TSE and ASR.

When a first enable signal TSE is a logic high level and a second enable signal ASR is a logic low level, the flag signal selection unit 24 selects the plurality of third flag signals D_TEMP A, D_TEMP B and D_TEMP C and outputs the selected signals as the plurality of first flag signals FLAG A, FLAG B and FLAG C. That is, the plurality of first flag signals FLAG A, FLAG B and FLAG C have the predetermined logic level.

In the other cases, except when the first enable signal TSE is a logic high level and the second enable signal ASR is a logic low level, the flag signal selection unit 24 selects the plurality of second flag signals TEMP A, TEMP B and TEMP C and outputs the selected signals as the plurality of first flag signals FLAG A, FLAG B and FLAG C. That is, the plurality of first flag signals FLAG A, FLAG B and FLAG C have a variable logic level according to the temperature information code THERMAL_CODE.

The plurality of third flag signals D_TEMP A, D_TEMP B and D_TEMP C have a constant logic level regardless of the temperature information code THERMAL_CODE.

The flag signal selection unit 24 includes a multiplexer for receiving the plurality of second flag signals TEMP A, TEMP B and TEMP C as a first input, and the plurality of third flag signals D_TEMP A, D_TEMP B and D_TEMP C as a second input, respectively. The multiplexer selects one of the first and the second inputs to output the selected signal as the plurality of first flag signals FLAG A, FLAG B and FLAG C in response to the enable signals TSE and ASR.

The flag signal generation unit 22 activates relatively large numbers of flag signals among the plurality of first flag signals FLAG A, FLAG B and FLAG C when the temperature information code THERMAL_CODE has a relatively high internal temperature information of the semiconductor device. On the other hand, the flag signal generation unit 22 activates relatively small numbers of flag signals among the plurality of first flag signals FLAG A, FLAG B and FLAG C when the temperature information code THERMAL_CODE has a relatively low internal temperature information of the semiconductor device.

The self refresh period change unit 30 increases the period of the self refresh operation when relatively small numbers of flag signals among the plurality of first flag signals FLAG A, FLAG B and FLAG C are activated.

Likewise, the self refresh period change unit 30 decreases the period of the self refresh operation when relatively large numbers of flag signals among the plurality of first flag signals FLAG A, FLAG B and FLAG C are activated.

The above-mentioned temperature information code generation unit 10 included in the ODTS is operated in response to two enables signals which control an operation mode. Detailed descriptions of the operation of the temperature information code generation unit 10 are described below.

TABLE 2

| Enable Signal | | On-Die Thermal Sensor Operation | |
| --- | --- | --- | --- |
| TSE (Thermal Sensor Enable) | ASR (Auto Self Refresh) | Normal Operation | Self Refresh Operation |
| L | L | Disable | Disable |
| L | H | Disable | Enable |
| H | L | Enable | Enable |
| H | H | Enable | Enable |

Referring to Table. 2, an on/off of the temperature information code generation unit 10 is controlled in response to the first enable signal TSE at the normal mode and is controlled in response to the first or the second enable signals TSE or ASR at the self refresh mode.

That is, when the first and the second enable signals TSE and ASR are inactivated as a logic low level, the temperature information code generation unit 10 is disabled at the normal mode and the self refresh mode.

Likewise, when the first enable signal TSE is inactivated as a logic low level and the second enable signal ASR is activated as a logic high level, the temperature information code generation unit 10 is disabled at the normal mode and is enabled at the self refresh mode.

When the first enable signal TSE is activated as a logic high level, the temperature information code generation unit 10 is enabled at the normal mode and the self refresh mode regardless of a logic state of the second enable signal ASR.

Figure 6:
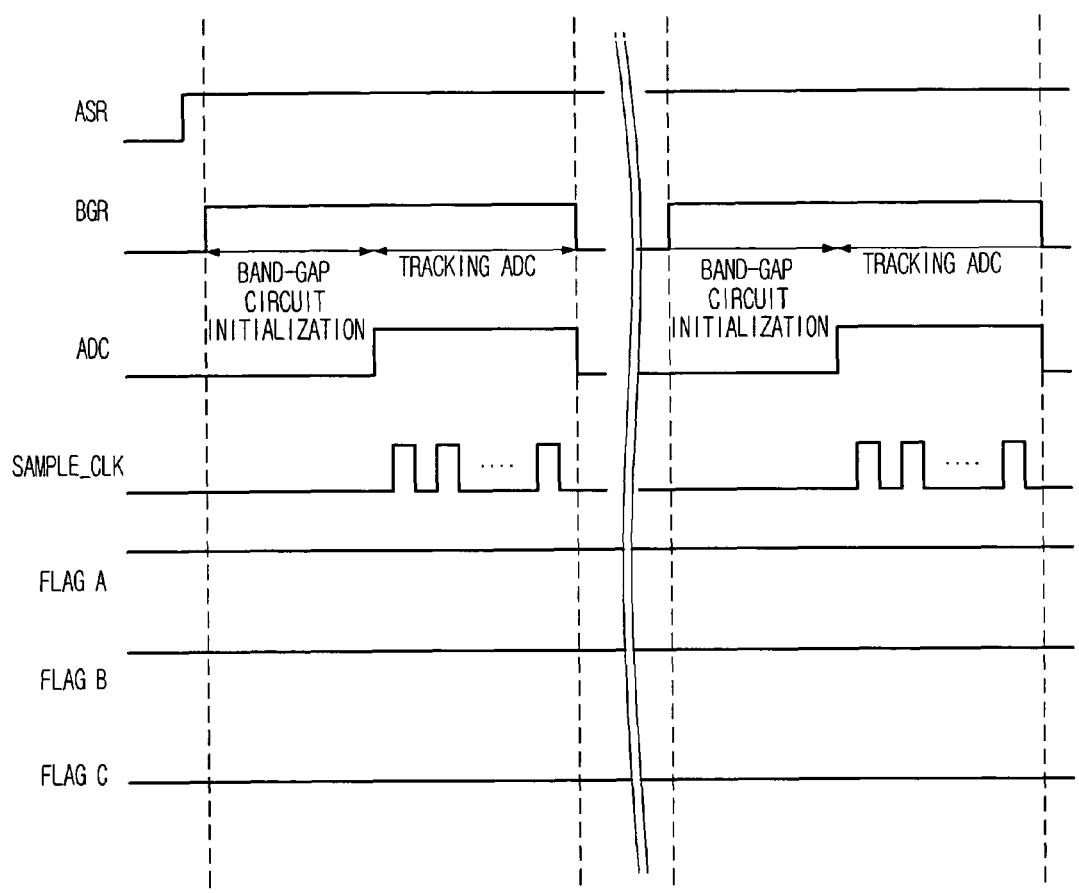
FIG. 6 is a waveform diagram illustrating an operation of the ODTS shown in FIG. 5 at a self refresh operation.

FIG. 6 is a waveform diagram illustrating an operation of the ODTS shown in FIG. 5 at the self refresh operation.

Referring to FIGS. 5 and 6, an operational sequence of the ODTS is described below.

First, when the second enable signal ASR is activated, an initialization operation of the ODTS begins.

Second, in response to the activation of the second enable signal ASR, a first operation control signal BGR is activated and output from a memory controller.

Third, in response to the activation of the first operation control signal BGR, a temperature sensing unit 122 senses a temperature of the semiconductor device and initializes a voltage level of the temperature voltage VTEMP which is generated according to the sensed temperature.

In response to the activation of the first operation control signal BGR, an adjustment unit 124 initializes voltages levels of the first and the second variation voltages VULIMIT and VLLIMIT.

The endurance time of the activation of the first operation control signal BGR, i.e., the initialization time of the temperature sensing unit 122 and the adjustment unit 124, is defined in the memory controller.

Fourth, when the initialization operations of the temperature sensing unit 122 and the adjustment unit 124 are finished, the memory controller activates and outputs a second operation control signal ADC.

Fifth, in response to the activation of the second operation control signal ADC, the DAC 1442, the comparator 1422, the up/down counter 1424, the decoder 1444 and the filtering unit 1426 are operated so that the operation of converting a voltage level of the temperature voltage VTEMP which is an analog value to the temperature information code THERMAL_CODE which is a digital value begins.

According to characteristics of the up/down counter 1424, the temperature information code THERMAL_CODE is increased or decreased by one bit at a single converting operation. Therefore, the voltage level of the temperature voltage VTEMP is converted to the temperature information code THERMAL_CODE by repeatedly performing the converting operation.

That is, the sample clock SAMPLE_CLK should repeatedly toggle during the activation period of the second operation control signal ADC.

Further, at each converting operation, the temperature information code THERMAL_CODE output from the up/down counter 1424 is stored into the multipurpose register 16. That is, at each converting operation, the temperature information of the semiconductor device is updated.

When the first enable signal TSE is a logic high level and the second enable signal ASR is a logic low level, the flag signal selection unit 24 selects the plurality of third flag signals D_TEMP A, D_TEMP B and D_TEMP C and outputs the selected signals as the plurality of first flag signals FLAG A, FLAG B and FLAG C. That is, the plurality of first flag signals FLAG A, FLAG B and FLAG C have the predetermined logic level shown in FIG. 6.

The endurance time of the activation of the second operation control signal ADC, i.e., the time of converting the voltage level of the temperature voltage VTEMP to the temperature information code THERMAL_CODE, is defined in the memory controller.

Sixth, when the second operation control signal ADC, the first operation control signals BGR and the auto self refresh signal ASR are inactivated one after another, the initialization operation of the ODTS is completed.

Through the above-mentioned first to sixth steps, at the self refresh operation, the initialization operation of the ODTS is completed.

As above-mentioned, in accordance with the preferred embodiment of the present invention, the temperature information code generation unit 10 is operated regardless of the operation mode of the semiconductor device and, thus, wrong temperature information will not be generated at a particular operation mode.

In accordance with the preferred embodiment of the present invention, even when the first enable signal TSE is a logic high level and the second enable signal ASR is a logic low level, the ODTS is operated regardless of the operation mode of the semiconductor device.

That is, when the semiconductor device enters the normal mode (normal mode entry), the ODTS stores the temperature information of the semiconductor device into the multipurpose register 16.

Further, even if the semiconductor device exits from the normal mode (normal mode exit) and enters the self refresh mode (self refresh mode entry), the ODTS is continuously operated to thereby store the temperature information of the semiconductor device into the multipurpose register 16.

At the same time, the flag signal logic determination unit 20 makes the plurality of first flag signals FLAG A, FLAG B and FLAG C have the predetermined logic level so that the period of the self refresh operation is not changed according to the ODTS.

Therefore, even if the self refresh mode is kept for a long time (long self refresh entry/exit), the temperature information of the semiconductor device stored in the multipurpose register at the self refresh mode entry is same to an actual temperature of the semiconductor device at the self refresh mode exit. Accordingly, generation of incorrect temperature information is prevented.

While the present invention has been respect to the specific embodiments, it will be apparent to those skilled in the art that various changes and modifications may be made without departing from the spirit and scope of the invention as defined in the following claims.

What is claimed is:

1. An on die thermal sensor (ODTS) for use in a semiconductor device, comprising:
   a temperature information code generation unit for sensing an internal temperature of the semiconductor device in response to first and second enable signals and for generating a temperature information code including the sensed temperature information; and
   a flag signal logic determination unit for generating a plurality of first flag signals having temperature information and for determining whether the plurality of first flag signals have a predetermined logic level or a variable logic level in response to the first and second enable signals.

2. The ODTS as recited in claim 1, wherein the flag signal logic determination unit includes:

a flag signal generation unit for generating a plurality of second flag signals whose logic levels are changed according to the temperature information code; and a flag signal selection unit for selecting one of the plurality of second flag signals and a plurality of third flag signals to output the selected signal as the plurality of first flag signals in response to the first and second enable signals, the third flag signals having the predetermined logic level.

3. The ODTS as recited in claim 2, wherein the flag signal selection unit includes a multiplexer for receiving the plurality of second flag signals as a first input, the plurality of third flag signals as a second input and the first and second enable signals as a selection input, respectively, and selecting one of the second flag signals and the third flag signals in response to the first and second enable signals in order to output the selected signal as the first flag signals.

4. The ODTS as recited in claim 2, wherein the flag signal generation unit activates relatively large numbers of flag signals among the plurality of first flag signals when the temperature information code has relatively high internal temperature information of the semiconductor device.

5. The ODTS as recited in claim 2, wherein the flag signal generation unit activates relatively small numbers of flag signals among the plurality of first flag signals when the temperature information code has relatively low internal temperature information of the semiconductor device.

6. The ODTS as recited in claim 2, wherein the plurality of third flag signals have a constant logic level regardless of the temperature information code.

7. The ODTS as recited in claim 1, wherein the temperature information code generation unit is controlled in response to the first enable signal at a normal mode and is controlled in response to the first or second enable signal at a self refresh mode.

8. The ODTS as recited in claim 7, wherein the temperature information code generation unit is disabled from operation at the normal mode and the self refresh mode when the first and second enable signals are inactivated.

9. The ODTS as recited in claim 7, wherein the temperature information code generation unit is disabled from operation at the normal mode and is enabled to be operated at the self refresh mode when the first enable signal is inactivated and the second enable signal is activated.

10. The ODTS as recited in claim 7, wherein the temperature information code generation unit is enabled to be operated regardless of the second enable signal when the first enable signal is activated.

11. The ODTS as recited in claim 1, wherein the temperature information code generation unit includes:

a temperature sensing unit for generating a temperature voltage, a first variation reference voltage and a second variation reference voltage, wherein the temperature voltage has minus (−) characteristics toward an increase of temperature and the first and the second variation reference voltages have a constant voltage level regardless of temperature variation; and an analog-digital converting unit for generating the temperature information code by converting the temperature voltage, which is an analog value, to the temperature information code, which is a digital value, according to each voltage level of the first and the second variation reference voltages.

12. The ODTS as recited in claim 11, wherein the temperature information code generation unit further includes a multipurpose register for receiving and storing the temperature information code.

13. The ODTS as recited in claim 11, wherein the analog-digital converting unit includes:

a comparison unit for comparing the temperature voltage with a tracking voltage in order to increase or decrease the temperature information code based on the comparison result; and a voltage level determination unit for determining a voltage level of the tracking voltage in response to the temperature information code, wherein the voltage level of the tracking voltage is smaller than or equal to the first variation reference voltage and is larger than or equal to the second variation reference voltage.

14. The ODTS as recited in claim 13, wherein the comparison unit includes:

a comparator for comparing the temperature voltage with the tracking voltage in response to a clock signal received from a controller in order to determine each logic level of an increase signal and a decrease signal according to the comparison result; and an up/down counter for increasing and decreasing the temperature information code in response to the increase signal and the decrease signal, wherein the up/down counter is operated in response to a delayed clock which is generated by delaying the clock signal.

15. The ODTS as recited in claim 14, wherein the comparison unit further includes a filtering unit for filtering the increase signal and the decrease signal in order to prevent the up/down counter from being incorrectly operated.

16. The ODTS as recited in claim 13, wherein the voltage level determination unit includes a digital-analog converter for converting the temperature information code to the tracking voltage, wherein a voltage level of the tracking voltage is changed in response to the first and the second variation reference voltages.

17. The ODTS as recited in claim 16, wherein the voltage level determination unit further includes a decoder for decoding the temperature information code and for transferring the decoded signal to the digital-analog converter in order to prevent the digital-analog converter from being incorrectly operated.

18. A semiconductor device, comprising:

a temperature information code generation unit for sensing an internal temperature of the semiconductor device at an on state in response to first and second enable signals and generating a temperature information code including the sensed temperature information;

a flag signal logic determination unit for generating a plurality of first flag signals having temperature information, and determining whether the plurality of first flag signals have a predetermined logic level or a variable logic level in response to the first and second enable signals; and a self refresh period change unit for changing a period of a self refresh operation at a self refresh mode in response to the plurality of first flag signals.

19. The semiconductor device as recited in claim 18, wherein the flag signal logic determination unit includes:

a flag signal generation unit for generating a plurality of second flag signals whose logic levels are changed according to the temperature information code; and a flag signal selection unit for selecting one of the plurality of second flag signals and a plurality of third flag signals to output the selected signal as the plurality of first flag signals in response to the first and second enable signals, the third flag signals having the predetermined logic level.

20. The semiconductor device as recited in claim 19, wherein the flag signal selection unit includes a multiplexer for receiving the plurality of second flag signals as a first input, the plurality of third flag signals as a second input and the first and second enable signals as a selection input, respectively, and selecting one of the second flag signals and the third flag signals in response to the first and second enable signals in order to output the selected signal as the first flag signals.

21. The semiconductor device as recited in claim 18, wherein the flag signal logic determination unit activates relatively large numbers of flag signals among the plurality of first flag signals when the temperature information code has relatively high internal temperature information of the semiconductor device.

22. The semiconductor device as recited in claim 21, wherein the self refresh period change unit decreases the period of the self refresh operation when relatively large numbers of flag signals among the plurality of first flag signals are activated.

23. The semiconductor device as recited in claim 18, wherein the flag signal logic determination unit activates relatively small numbers of flag signals among the plurality of first flag signals when the temperature information code has relatively low internal temperature information of the semiconductor device.

24. The semiconductor device as recited in claim 23, wherein the self refresh period change unit increases the period of the self refresh operation when relatively small numbers of flag signals among the plurality of first flag signals are activated.

25. The semiconductor device as recited in claim 19, wherein the plurality of third flag signals have a constant logic level regardless of the temperature information code.

* * * * *